(No Model.)
G. WESTINGHOUSE, Jr.
SYSTEM OF ELECTRICAL DISTRIBUTION.
No. 373,035. Patented Nov. 8, 1887.
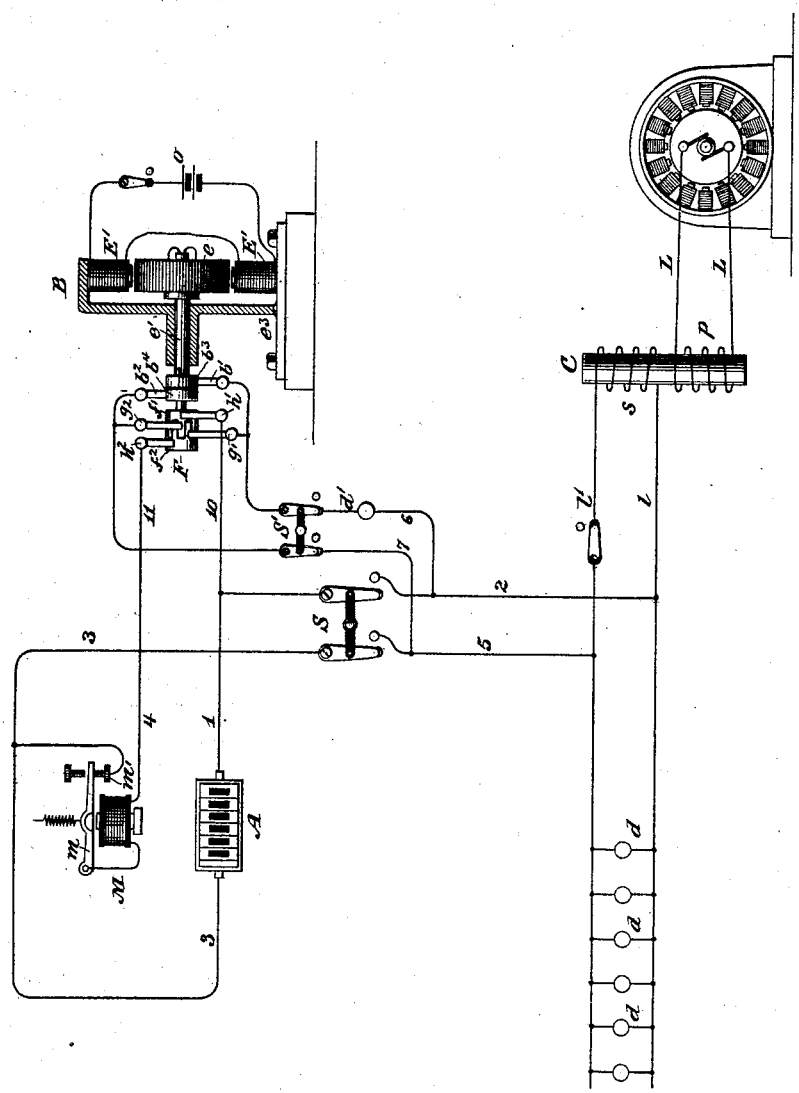
Witnesses
Geo. W. Breck
Carrie E. Ashley
Inventor
George Westinghouse Jr.
By his Attorneys
Pope & Edgecomb

UNITED STATES PATENT OFFICE.

GEORGE WESTINGHOUSE, JR., OF PITTSBURG, PENNSYLVANIA.

SYSTEM OF ELECTRICAL DISTRIBUTION.

SPECIFICATION forming part of Letters Patent No. 373,035, dated November 8, 1887.

Application filed February 4, 1887. Serial No. 226,498. (No model.)

*To all whom it may concern:*

Be it known that I, GEORGE WESTINGHOUSE, Jr., a citizen of the United States, residing in Pittsburg, in the county of Allegheny and State of Pennsylvania, have invented certain new and useful Improvements in Systems of Electrical Distribution, of which the following is a specification.

The invention relates to an organization of circuits and apparatus designed to be employed, in connection with an alternate-current system of electric lighting or other translating system, for the purpose of storing up energy to provide against an emergency—as, for instance, the interrupting of the supply-circuit connections.

The invention consists generally in employing, in connection with a supply-circuit and an electric converter receiving currents therefrom, an alternate-current motor serving to operate a commutator which serves to rectify or straighten the current. This rectified current is supplied to a storage-battery, which is thus charged. The current from the storage-battery is reserved until it is required for supplying the circuit, which is normally supplied from the main line, or for supplying other circuits.

In the accompanying drawing there is shown, in diagram, an organization of circuits and apparatus adapted to carry out the invention.

Referring to the figure, L represents a main line adapted to supply alternating currents to the primary coil $p$ of a converter, C. The secondary coil $s$ of this converter has its respective terminals connected with a system of conductors, $l\ l'$, which supply translating devices—such, for instance, as incandescent electric lights $d\ d$.

A storage-battery, A, is employed for supplying the place of the converter C, when, for any reason, the current transmitted or induced therethrough is interrupted. The current from the storage-battery would, it is evident, be a continuous current instead of an alternating current, but the translating devices $d$ could be operated thereby. One pole of the battery A is connected, by the conductors 1 and 2, with a conductor, $l$, while the other pole is connected, by conductors 3 and 5, with the conductor $l'$. A switch, S, serves to interrupt the connections of the conductors 2 and 5, except when it is necessary to employ the battery.

For the purpose of charging the storage-battery A it is necessary to straighten or rectify the currents transmitted through the converter C. For this purpose conductors 6 and 7 lead, respectively, from the conductors 2 and 5 to contact-brushes $b'$ and $b^2$ of an alternate-current electric motor, B. This motor may be constructed in any convenient manner, being adapted to respond to and move synchronously with the alternations in the current supplied through the main line L.

The motor is preferably constructed with field-magnets E′, which may either be permanent magnets or have their coils included in the circuit of a local battery, $o$. An armature, $e$, revolves within the circular field formed by the field-magnets. The armature is supported upon a shaft, $e'$, which extends through a suitable bearing united to the field-magnets. One arm of the field-magnets may be extended, as shown at $e^3$, to form a support for the entire motor. The brushes $b'$ and $b^2$ bear against corresponding contact-rings $b^3$ and $b^4$, which are connected with the respective terminals of the armature coils. The motor is so constructed that when revolving at a suitable speed the number of poles of the field-magnet passed by each pole of the armature per minute will correspond to the number of alternations per minute in the current supplied. The alternating current will insure a continual synchronous movement on the part of the motor. The motor is constructed to be driven by a small current, and it may be always in motion.

Upon the shaft $e'$ of the motor there is carried a rectifying-commutator, F. This consists of two series of contact-plates, $f'$ and $f^2$, and two pairs of brushes, $g'$ and $g^2$ and $h'\ h^2$, respectively applied thereto. The first pair of brushes, $g'\ g^2$, are connected, respectively, with the conductors 6 and 7, while the latter pair, $h'\ h^2$, are respectively connected by the conductors 10 and 11 with the conductors 1 and 4, leading to the storage-battery A. The number of contact-sections upon the commutator F is so proportioned to the rate of revolution of the shaft that the number of alternations per minute will correspond to the number of sections passing beneath the brushes of the commutator, so that the circuit-connections from the line 6 and 7, through the brushes $g'$ and $g^2$, to the brushes $h'$ and $h^2$, will be reversed at each alternation of the current, and the resultant current transmitted upon the lines 10 and 11 will be continuous. This serves to charge the storage-battery A. A switch, S', may be employed for interrupting the connections of the conductors 6 and 7 when the battery A is employed for supplying the current.

For the purpose of interrupting the connections of the storage-battery when the latter has acquired a sufficient charge, an electro-magnetic cut-out, M, is included between the conductors 3 and 4, for instance, leading to the battery. The armature $m$ is placed by hand in contact with its front contact-point, $m'$, with which the conductor 3 is connected. The conductor 4 leads from the armature. When the battery is charged, the current ceasing to flow, the armature will be released, thus interrupting the circuit.

The motor B may be started either by hand or by an external source of electricity, or, in some instances, it may be found desirable to have it continue its revolution when once started. The current consumed by the motor will be very small, and to prevent too great a current from passing through it an incandescent electric lamp, $d'$, may be included in the conductor 6. If the lights $d\,d$ are constructed to require currents of one hundred volts, then the light $d'$ should be made to require a current which, when added to the current required for the motor, will equal one hundred volts.

It is not necessary that the rectified current be derived from the secondary of the induction-coil, as it may be derived from the supply-circuit L directly.

I claim as my invention—

1. The combination of a source of alternating currents, a translating system operated thereby, a commutating device for rectifying a portion of the alternating current, and a storage-battery charged by such rectified current.

2. The combination, with a source of alternating currents, of a storage-battery, a motor driven by the alternating currents, a commutator driven by the motor, and conductors connecting said source with said storage-battery through said commutator.

3. The combination of a source of alternating currents, translating devices supplied therefrom, an alternate-current motor in a shunt-circuit around said devices, a rectifying-commutator driven by the motor, and conductors leading from said source to said commutator.

4. The combination, with a main line and a means for supplying the same with alternating electric currents, of a converter having its primary coil in circuit therewith, an alternate-current electric motor connected in circuit with the secondary coil of the converter, a rectifying-commutator driven thereby, conductors leading from the secondary coil to said commutator, and a storage-battery connected with said commutator.

5. The combination, with a source of alternating currents and a commutator for rectifying such currents, of a storage-battery, a switch for connecting the battery with said commutator, and a switch for connecting said battery with conductors normally leading from said source.

6. The combination, with a source of alternating electric currents and a system of incandescent lights operated thereby, of a commutating device driven thereby, a storage-battery supplied with a continuous current through said commutating device, a switch for connecting said storage-battery with the translating devices, and a switch for disconnecting the same from the commutating device.

In testimony whereof I have hereunto subscribed my name this 15th day of November, A. D. 1886.

GEO. WESTINGHOUSE, JR.

Witnesses:
CHARLES A. TERRY,
DANL. W. EDGECOMB.